March 1, 1932.  W. VORWERK  1,847,580
RIBBON FOR SUPPORTING THE BUTTON OF GARTERS
Filed Aug. 24, 1929
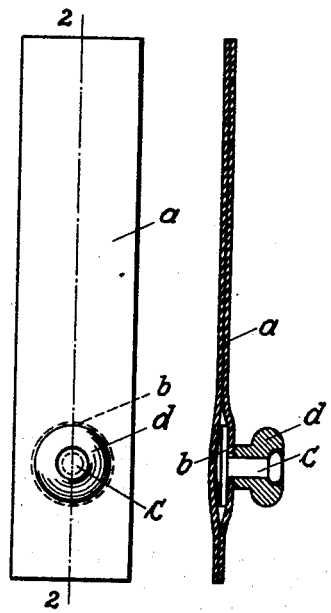
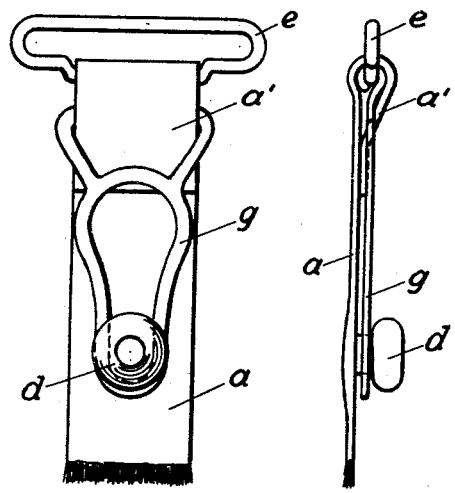
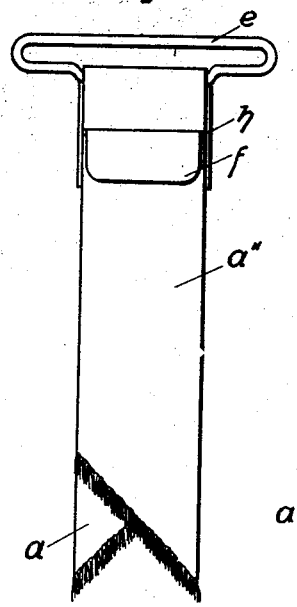
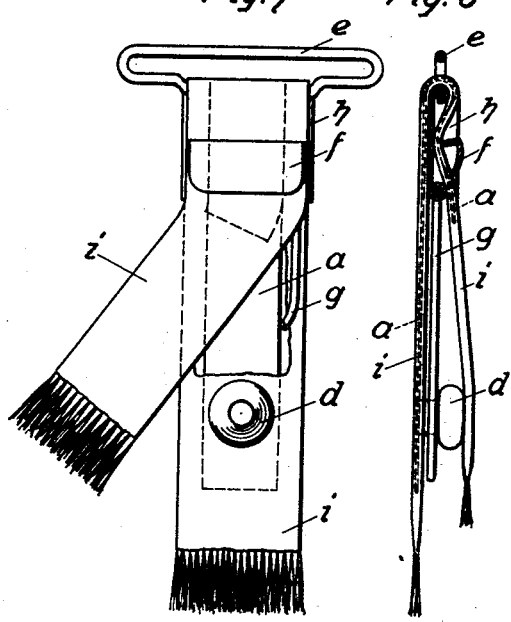
Inventor:
Wilhelm Vorwerk
by Kuhichaetn
Atty Patented Mar. 1, 1932

1,847,580

UNITED STATES PATENT OFFICE

WILHELM VORWERK, OF BARMEN, GERMANY

RIBBON FOR SUPPORTING THE BUTTON OF GARTERS

Application filed August 24, 1929, Serial No. 388,164, and in Germany March 16, 1929.

My invention relates to tabs for holding the studs of hose supporters. It is an object of my invention to provide a tab which is readily exchangeable as the life of the tab is usually shorter than the life of the stud.

To this end I make the tab of band which is hollow throughout its length. In the band I secure a stem which partly projects through a hole in the band and on the projecting portion of the stem I secure a sleeve forming the completed stud.

The bands for tabs according to my invention are obtained readily by cutting into corresponding lengths circular goods made on a ribbon loom or on a braiding machine. The pieces of tabs are open at both ends so that the corresponding stem, with its base plate, is readily inserted and removed through one of the open ends, and the stem is threaded through the hole in the band, ready for the reception of a sleeve which is preferably made of rubber in the usual manner and forced on the stem. When the band has become worn the sleeve is removed, the stem of the stud is threaded through the hole and extracted from the band at one end whereupon the stem is threaded into a new band in the manner described, and the sleeve is secured on the stem.

My novel tab is an important improvement over the tabs made heretofore, in which a plain ribbon was folded into a loop, and the ends of the loop were connected to a pad or other member by sewing. The loops thus formed are open at the sides. This is just what applicant seeks to avoid in replacing the loop by a hollow band. In a loop which is open at the sides the ribbon frequently shrinks or is otherwise deformed by wear and so it may happen that the base plate at the inner end of the stem is exposed. The same will happen if the stem assumes an inclined position to the central plane of the loop. The base plate is normally made of metal and therefore it must not get into contact with the leg or with a garment.

It has already been suggested to permanently secure the base plate to the ribbon with a view to eliminating its tendency to project from the loop but obviously this is incompatible with exchangeability. On the other hand by inserting the stem with its base plate in a hollow band according to my invention the base plate is held out of contact with the leg or garments of the wearer under all conditions.

It has also been suggested in suspenders to form a strap by sewing about a stud a flat piece of fabric so as to form a pocket which encloses the base plate of the stud on all sides. The base plate is not exposed in such a pocket but the stud is a permanent fixture in the pocket and cannot be exchanged without opening its seams.

These drawbacks are removed according to my invention in which the base plate of the stud is concealed in the tubular or hollow band and only the sleeve is exposed. In this manner damage to garments or chafing by the plate is prevented and at the same time the attachment of the stud to the band is much facilitated, as its stem is held by the hole in the fabric.

The stem of the stud may be combined with the band during the manufacture of the band or inserted in the finished band.

In the drawings affixed to this specification and forming part thereof a tubular or hollow band with a stud, and various adaptations of the hollow band to a loop for connection with the leg band, are illustrated diagrammatically by way of example.

In the drawings

Fig. 1 is an elevation of the band showing the sleeve on the stem of its stud,

Fig. 2 is an end elevation of the band, partly in section on the line 2—2 in Fig. 1, Fig. 3 is an elevation, Fig. 4 is an end elevation showing the band secured to a loop by doubling up its upper end and sewing it to the body of the band, Fig. 5 is an elevation, Fig. 6 is an end elevation of a band which is held in a clamp, Fig. 7 is an elevation, partly broken away, and Fig. 8 is an end elevation, partly in section, showing the band inserted in another hollow band and the units including the two bands held in a clamp.

Referring now to the drawings and first to Figs. 1 and 2, $a$ is a tubular or hollow band, which is made in any desired length on a ribbon loom or braiding machine, and is then cut into suitable lengths. At one end of each length a button hole is provided. $b$ is a base plate, $c$ is a stem on the base plate, and $d$ is a sleeve of rubber on the stem. The base plate $b$ with the stem $c$ is inserted in the cavity of the band, with the stem $c$ exposed through the button hole, and the sleeve $d$ is forced onto the stem.

As mentioned, the base plates with the projecting stems may be worked into the band at suitable points so that after cutting the band into lengths, the article is finished by securing the sleeves $d$ on the projecting stems $c$.

Referring now to Figs. 3–8, $e$ is a loop by which the band with the stud is attached to a leg band, the usual pad, not shown, being provided.

As illustrated in Figs. 3 and 4, the upper end $a'$ of the band is doubled up and sewn to its body. $g$ is a clasp which is hinged to the loop $e$ so as to engage the sleeve $d$. This is a cheap and simple appliance. A more elaborate appliance is illustrated in Figs. 5 and 6 in which the band $a$ with the stud therein is held in a bracket $h$ by means of a clamp $f$. The length of the band is such that its outer reach $a''$ conceals the clasp $g$, the bracket $h$ except its flanges, and the sleeve $d$.

Referring now to Figs. 7 and 8 these illustrate the combination of a hollow band $a$, with the stud secured thereto by its base plate $b$ and stem $c$, as described, with an ornamental sheath $i$, also of a hollow band, in which the inner band $a$ is inserted. The inner band $a$ is preferably shorter than the ornamental band $i$ so that it projects only a short distance beyond the point where the unit is held by the clamp $f$. The stud is connected with the band $a$ in the manner described with reference to Figs. 1 and 2. The ornamental hollow band $i$ extends beyond this point and conceals the stud, as described with reference to Figs. 5 and 6. The inner band $a$ has only a mechanical function in this case and its appearance is not a consideration as it does not show. Therefore it may be made of any fabric which must be strong, such as cotton, but may be coarse and unsightly. The outer band $i$, on the other hand, is a decoration only and so may be made of material which is of better appearance than the inner band $a$, for instance, artificial silk, and its ends may be fringed, as shown.

A hole is made in the outer band $i$ which in the example illustrated in Figs. 7 and 8 is so large that the base of the sleeve $d$ is applied to the outer face of the inner band $a$ through the hole in the outer band $i$.

I wish it to be understood that I do not desire to be limited to the exact details of construction shown and described for obvious modifications will occur to a person skilled in the art.

I claim:

1. A tab for holding the studs of hose supporters comprising a band which is tubular throughout its length, a stem in said band projecting partly through a hole in the band, and a sleeve on the projecting portion of said stem.

2. A tab for holding the studs of hose supporters comprising a band which is tubular throughout its length, a base plate inserted in said band, a stem on said base plate projecting through a hole in the band, and a sleeve on the outer end of said stem.

3. A tab for holding the studs of hose supporters comprising a band which is tubular throughout its length, a base plate inserted in said band, a stem on said base plate projecting through a hole in the band, and a detachable sleeve on the outer end of said stem.

4. A tab for holding the studs of hose supporters comprising a band which is tubular throughout its length, a base plate inserted in said band, a stem on said base plate projecting through a hole in the band, and a sleeve of resilient material adapted to be forced on the outer end of said stem.

5. A tab for holding the studs of hose supporters comprising a hollow inner band, a hollow outer band in which said inner band is inserted, a stem in said inner band partly projecting through holes in said inner and outer bands, and a sleeve on the projecting portion of said stem.

In testimony whereof I affix my signature.

WILHELM VORWERK.